United States Patent [19]
Fedjukin et al.

[11] 3,846,611
[45] Nov. 5, 1974

[54] TOOL FOR SHAPING ARTICLES TO A PATTERN

[76] Inventors: Dmitry Lvovich Fedjukin, B-Cherkizovskaya ulitsa, 10-a, kv. 32; Ljudmila Semenovna Sergeeva, Leninsky prospekt, 97b, 107, kv. 59; Andrei Nikolaevich Bakharev, 3 Cherkizovskaya ulitsa 78, kv. 2; Inna Leonidovna Gorlina, ulitsa Panfilova 4/5, korpus 4, kv. 79; Anatoly Izrailevich Aronov, ultisa Vavilova 44, korpus 4, kv. 69; Arkady Timofeevich Kravets, ulitsa Vavilova 44, korpus 4, kv. 3; Petr Evmenovich Korochkin, Nizhne-Pervomaiskaya ulitsa 66, kv. 32; Alexei Ivanovich Titov, Beregovoi prospekt, 7, korpus 2, kv. 69, all of Moscow, U.S.S.R.

[22] Filed: Aug. 15, 1973

[21] Appl. No.: 388,642

[52] U.S. Cl. .............................................. 219/69 E
[51] Int. Cl. ................................................ B23k 9/16
[58] Field of Search.......... 219/69 E; 33/23 E, 23 L, 33/174 P, 174 L, 29 E

[56] References Cited
UNITED STATES PATENTS

| | | | |
|---|---|---|---|
| 2,793,569 | 5/1957 | Tanner et al. | 33/23 E X |
| 2,909,641 | 10/1959 | Kucyr | 219/69 E |
| 3,271,281 | 9/1966 | Brown et al. | 219/69 E UX |
| 3,433,727 | 3/1969 | Keeleric | 219/69 E X |

*Primary Examiner*—J. V. Truhe
*Attorney, Agent, or Firm*—Waters, Roditi, Schwartz & Nissen

[57] ABSTRACT

Shaping is done by way of the three-dimensional copying of a tool shaped as a pattern on an article, said tool fashioned as a pack of tightly fitting plates set in one sequence conditioned by the shape of the pattern and reset in the pack in a reverse sequence conditioning the mirror-image presentation of the pattern shape on the tool for shaping articles with the mirror-image presentation of the pattern shape.

Said tool can be used most effectively for manufacturing dies and press molds, particularly in shoe-making industry where it is necessary to produce pair articles one of which is the mirror-image presentation of the other.

2 Claims, 6 Drawing Figures

TOOL FOR SHAPING ARTICLES TO A PATTERN

The present invention relates to the methods of the three-dimensional copying of a tool on an article and more particularly to tools for shaping articles to a pattern.

The invention can prove most useful when used for manufacturing dies and molds, especially in shoe-making industry where it is necessary to produce pair articles either of which is a mirror-image presentation of the other.

Known in the art are tools for shaping articles to patterns by way of the three-dimensional copying of a tool shaped as a pattern.

The known tools are made of invariable shape which is a three-dimensional copy of the pattern in the form of an impression.

To manufacture such tools, it is necessary that each of them has its own pattern shaped exactly as an article to be worked by said tool. For pair articles whose shapes are the mirror-image presentations of each other, i.e., for shoe dies for right and left feet, two patterns are required, whose shapes are the mirror-image presentations of each other.

The primary object of the present invention is to provide a tool for shaping articles to a pattern which, though simple in design and easy to make, would permit the shaping of articles with both the direct and mirror-image presentation of the pattern shape.

The main object of the invention has been achieved by providing a tool, according to the invention, fashioned as a pack of tightly fitting plates, each plate having the profile of a pattern section corresponding to this plate, said plates set in one sequence conditioned by the pattern shape and reset in the pack in a reverse sequence conditioning the mirror-image presentation of the pattern shape on a tool for shaping articles with the mirror-image presentation of the pattern shape.

This object is accomplished by that, the tool of the invention is fashioned as a pack of tightly fitting plates, each plate having the profile of a pattern section corresponding to this plate, said plates set in one sequence conditioned by the pattern shape and reset in the pack in a reverse sequence conditioning the mirror-image presentation of the pattern shape on a tool for shaping articles with the mirror-image presentation of the pattern shape.

Thus, the tool made according to the invention permits to produce articles with both the direct and mirror-image presentations of the shape, which helps substantially reduce the time and facilitate the process of manufacturing articles with the mirror-image presentation of the pattern shape and offers a big economic effect.

In case of the electroerosion or electrochemical three-dimensional copying of the tool shape on an article, it is practicable to utilize a tool made, according to the invention, as a packet set of graphite plates.

Owing to the high resistance of graphite plates, such tool can be utilized repeatedly for producing articles with both the direct and mirror-image presentations of the pattern shape and is valuable commercially.

Other characteristics and advantages of the invention will be more apparent from the following description of its exemplary embodiment and appended drawings, wherein.

Figure 1:
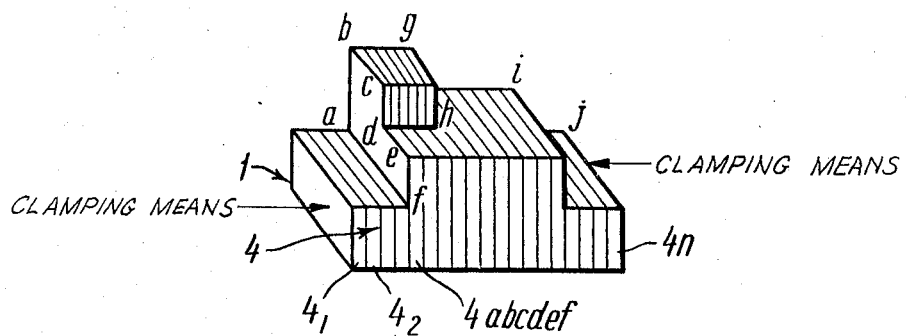
FIG. 1 shows schematcially a tool of the invention set of plates.
Figure 2:
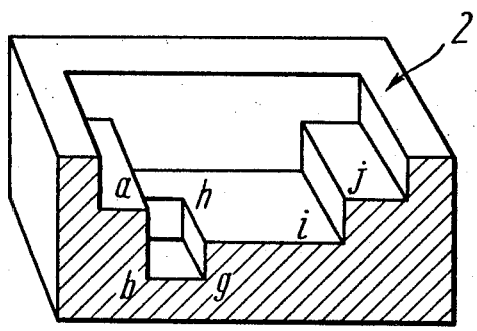
FIG. 2 is a cross-section of an article manufactured with the aid of the abovementioned tool by way of three-dimensional copying.

According to the present invention it is disclosed a tool 1 (FIG. 1) for shaping articles 2 (FIG. 2) to a pattern 3 (FIG. 3) by way of the three-dimensional copying, on an article 2, of the shape of the tool 1 having the three-dimensional shape of the pattern 3.

According to the invention, the tool 1 (FIG. 1) is made as a pack of tightly fitting plates 4, each plate, e.g., plate 4 'abcdef', having the profile of a section 'abcdef' of the pattern 3 (FIG. 3) corresponding to this plate, said plates set in one sequence $4_1, 4_2, \ldots 4_n$ conditioned by the shape 'abghij' of the pattern 3 and reset in the pack in a reverse sequence $4_n \ldots 4_2, 4_1$ (FIG. 4) conditioning the mirror-image presentation (jihgba) of the shape of the pattern 3 on the tool $l_1$ (FIG. 4) for shaping an article $2_1$ (FIG. 5) with the mirror-image (jihgba) presentation of the shape 'abghij' (FIG. 3) of the original pattern.

The shaping of articles to patterns by way of the three-dimensional copying with the tool of the invention is done in the following way.

Figure 6:
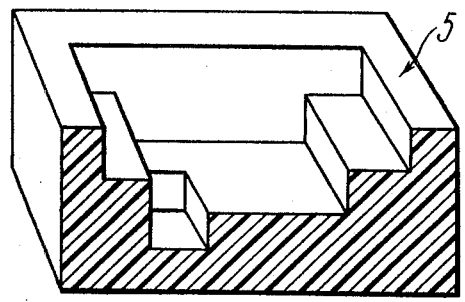
FIG. 6 is a longitudinal section of an intermediate tool being an impression of the three-dimensional shape of the original pattern.

An intermediate tool 5 (FIG. 6) is cast from a polymerizing material mixed with cutting particles to suit the plaster-made pattern 3. By means of this tool 5 imparted with reciprocating movement in three directions, they prepare a shape 'abcdefghij' of the electrode tool 1 (FIG. 1) preassembled from graphite plates 4.

Figure 3:
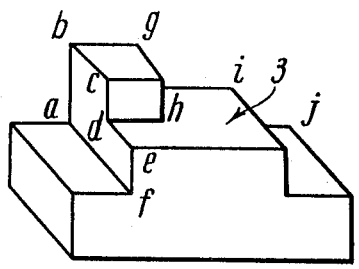
FIG. 3 shows the original pattern of a three-dimensional shape.

Said plates 4 are tightly fit in the pack braced by means of draw bars or coupling bolts or by any of the known suitable couplings. The thus made tool 1 is used to produce the article 2 (FIG. 2) by the electroerosion, electrochemical, or combined erosion-chemical method, said article 2 being, for example, a die or a mold whose surface copies the shape of the original pattern 3 (FIG. 3).

Figure 4:
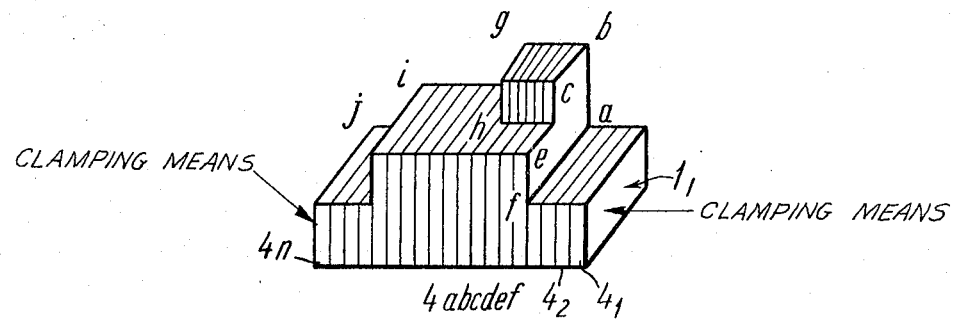
FIG. 4 is a tool, according to the invention, the plates thereof being reset in a reverse sequence.
Figure 5:
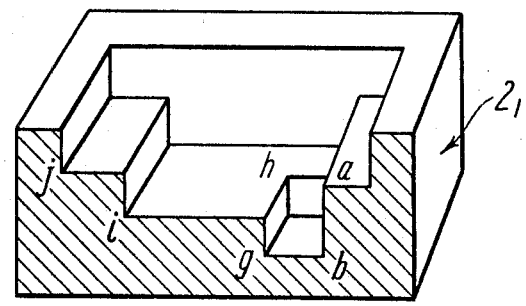
FIG. 5 is a longitudinal section of the article with the mirror-image presentation of the original pattern.

To secure the mirror-image presentation 'jihgfedcba' (FIG. 4) of the three-dimensional shape of the pattern 3 (FIG. 3) on the tool $l_1$ (FIG. 4), the plates 4 of the tool 1 must be reset, as shown on FIG. 4, in a reverse sequence $4_n \ldots 4_2, 4_1$ and joined into a pack by means of any known suitable coupling.

The use of a tool made of graphite plates is preferrable for the electroerosion or electrochemical shaping of articles by way of the three-dimensional copying of the tool shaped as the pattern on an article.

In some cases it turns out to be practical to make said tool of thin metal plates. Such tool, for instance, can be used as the three-dimensional shape for the plaster or plastic casting of ar article wbich is the 'secondary' pattern with the mirror-image presentation of the shape of the original pattern to which the tool was made originally. Manufactured to the "secondary" pattern produced with the aid of the tool of the invention by known methods of three-dimensional copying may be a variety of dies and press molds, casting molds and other articles with the mirror-image presentation of the shape of the original pattern.

Thus, the disclosed tool helps mechanize the manufacturing operation of articles which are the mirror-image presentation of the shape of the original pattern. Said tool permits quick production, to one original pattern, of articles with both the direct and mirror-image presentations of its shape.

The tool of the invention is simple in design and cheap to make. Its use is particularly promising in shoe-making industry for shaping, to one pattern, the press mold rigging for shaping pair articles for right and left shoes. This makes the shoe-making cycle shorter owing to a more rational shaping technique, offering greater choice of foot-wear in less time with due regard for demand and style.

The invention can have the following embodiment.

The tool according to the present invention, for the electroerosion and electrochemical three-dimensional copying of the shape of the tool on an article characterized in that it is made as an electrode tool 1 whose pack is set of graphite plates 4.

What we claim is:

1. A tool for electro-shaping articles to a pattern by way of three-dimensional copying of the tool having the shpae of the pattern, said tool comprising a pack of tightly fitting plates braced in the transverse direction at the ends thereof, at least some of said plates being of different lengths, each of said plates having an end surface dimensioned to conform to the profile of a respective cross-section of said pattern, said plates being arranged in one sequence conditioned by the shape of said pattern and adapted to be reset in the reverse sequence within said pack to produce a mirror image of the shape of said pattern on the tool for shaping articles with a mirror-image shape of said pattern.

2. A tool as claimed in claim 1, said pack being a set of graphite plates adapted to form an electrode.

* * * * *